United States Patent
Mitchell et al.

(10) Patent No.: US 6,330,361 B1
(45) Date of Patent: Dec. 11, 2001

(54) ADAPTIVELY ALIGNED OPTICAL CORRELATOR AND METHOD

(75) Inventors: Robert A. Mitchell, Woodland Hills; Stuart A. Mills, West Hills; James Ryan, Van Nuys, all of CA (US)

(73) Assignee: Litton Systems, Inc., Agoura Hills, CA (US)

( * ) Notice: Subject to any disclaimer, the term of this patent is extended or adjusted under 35 U.S.C. 154(b) by 0 days.

(21) Appl. No.: 09/268,789

(22) Filed: Mar. 16, 1999

(51) Int. Cl.[7] .............................. G06K 9/00; G06K 9/76; G06K 9/74; G06K 1/12; G06K 27/46
(52) U.S. Cl. ....................... 382/211; 382/151; 382/278; 382/287; 382/294; 359/11; 359/237; 359/561
(58) Field of Search ................................ 382/210, 211, 382/255, 151, 287, 294, 295, 278; 359/11, 237, 559, 561

(56) References Cited

U.S. PATENT DOCUMENTS

| | | | |
|---|---|---|---|
| 4,402,575 | * | 9/1983 | Jacobs ................................. 359/225 |
| 4,972,498 | * | 11/1990 | Leib .................................... 382/211 |
| 4,980,922 | * | 12/1990 | Leib .................................... 382/210 |
| 5,107,351 | * | 4/1992 | Leib et al. ........................... 359/11 |
| 5,175,775 | * | 12/1992 | Iwaki et al. ......................... 382/211 |
| 5,307,175 | * | 4/1994 | Seachman ............................ 358/401 |
| 5,309,523 | * | 5/1994 | Iwaki et al. ......................... 382/210 |
| 5,311,359 | | 5/1994 | Lucas et al. ......................... 359/561 |
| 6,091,461 | * | 7/2000 | Bardmesser .......................... 348/744 |

OTHER PUBLICATIONS

J. van Randeraat and R.E. Setterington, editors, Piezoelectric Ceramics Application Book, Table of Contents and Chapters 1, 2 and 4, (1974).

* cited by examiner

Primary Examiner—Leo Boudreau
Assistant Examiner—Daniel G. Mariam
(74) Attorney, Agent, or Firm—Koppel & Jacobs

(57) ABSTRACT

An improved optical correlator using a coherent light beam employs a method of adaptive alignment. A test pattern modulates an input spatial light modulator. The modulated beam propagates through passive transforming optical elements to a filter spatial light modulator, which is simultaneously modulated with an independently transformed frequency domain reference. The resulting correlation or coincidence of the optically transformed pattern with the independently transformed reference is processed to yield a feedback signal indicative of any optical misalignment of the optical correlator. The feedback signal drives a beam deflector to compensate by adjusting the path of the coherent beam, thereby improving and maintaining optical alignment of the correlator.

14 Claims, 8 Drawing Sheets

ADAPTIVELY ALIGNED OPTICAL CORRELATOR AND METHOD

FIELD OF THE INVENTION

The invention relates to optical image processors or correlator systems which use coherent light, spatial light modulators, and Fourier transform optics to process information or recognize patterns.

DESCRIPTION OF THE RELATED ART

It has long been known that two-dimensional spatial Fourier transform techniques can be used to process images. Pattern recognition, for example, is often facilitated by working with the Fourier transform of a spatially varying image rather than the original image. In particular, optical correlators produce the two dimensional correlation of an input image with a reference image. A high level of correlation at a localized area within the image frame indicates recognition of the reference image in that area. The correlation function is most easily performed by multiplying in frequency domain the Fourier transformation of an image with a "filter," which is a frequency domain representation of a reference image or images. The resulting (two dimensional) frequency function is then transformed back to the spatial domain. Although such processing can be done digitally, it can be performed much more rapidly by optical Fourier transformation of the image. Such high speed image processing finds numerous applications in diverse fields such as security, aviation, biomedical diagnostics and artificial intelligence.

Optical correlators using two dimensional Fourier transform optics and active, electronic spatial light modulators (SLMs) have been used to perform high speed, two-dimensional pattern recognition. For example, U.S. Pat. No. 5,311,359, to Lucas et al, describes an optical correlator system having a source of coherent light and a plurality of active and passive optical components placed along a folded, zig-zag optical path. The active optical components are an input SLM, a filter SLM, and a pixilated photodetector (usually a CCD device); each of these active elements is typically an array of electronically addressable active pixels, arranged in a two-dimensional matrix. The passive components include reflective focusing mirrors and polarizers. In the patented apparatus, the optical path is a tunnel contained within a block of a transparent ceramic with an extremely low coefficient of temperature expansion ($7 \times 10^{-8}/°$ C.).

FIG. 1 shows the prior art optical correlator of the Lucas patent, in which a coherent electromagnetic radiation source (typically a laser) 10 fixed within a solid optical support body 12 produces a collimated and polarized coherent beam of radiation 14. The beam 14 strikes a pixilated reflective input SLM 16 and is modulated by whatever pattern is electronically imposed on the input SLM 16. The modulation is spatially distributed. As discussed in the patent, if a magneto-optic SLM is used, the pixels of the SLM are each individually modulated electronically to cause rotation of the polarization of reflected light, as a function of the input signal addressed to that pixel. Such an SLM also requires an input polarizer and an exit polarizer which function as an analyzer (not shown in FIG. 1). The result is that some pixels of the array effectively absorb more while others reflect more, as a function of the electronic modulating pattern applied. The modulated beam 14 is reflected and propagates to a first focusing mirror 18. The beam 14 reflects from the first focusing mirror 18 and focuses at a filter SLM 20.

Provided that the first focusing mirror 18 has the correct focal length to image the input SLM 16 onto the filter SLM 20, it is a well known consequence of wave optics that the image formed at the plane of the filter SLM 20 will be optically transformed by a spatial Fourier transform into a frequency domain representation F (u,v) of the input image f (x,y) (where x and y are the spatial coordinates of the input SLM 16 and u and v are the spatial coordinates of the filter SLM 20). It must be understood that the Fourier transform referred to throughout is a Fourier transform of a function (intensity of modulation) varying with position (in this case position on the face of the input SLM 16). This Fourier transform of a spatially varying function is not to be confused with the Fourier transform of a time varying function, which is more familiar to engineers. The planar surfaces of the SLMs will actually present functions varying in two dimensions; thus the transformed image will be a two-dimensional Fourier transform representing in two dimensions the frequency components of a two-dimensional image.

The Fourier transformed image formed at the filter SLM 20 is further modulated at that focal plane by a two dimensional pattern or "filter." The filter is typically the previously obtained Fourier transform of some reference, and therefore consists of a pattern of frequency components mapped onto a two dimensional surface. As described in the prior art patent, the correlation of an input image with a reference image can be obtained by taking the product of the Fourier transformed input image and the Fourier transformed reference image. That product F (u,v)*H(u,v) (where H(u,v) is the filter) is then focused by a second focusing mirror 22 onto a photodetector 24. The resulting image at the photodetector 24 is the Fourier transform of the product image, which yields the correlation of the input image with the reference image (with inversion of the coordinates x and y at the detector). The correlation of the input function and the filter function thus appears at the photodetector 24 as a two-dimensional correlated optical intensity function.

The above described prior correlator must be precisely aligned optically for best operation. The optical components, including the input SLM 16, the filter SLM 20, the photodetector 24, and mirrors 18 and 22 must be adjusted into optical alignment with the beam 14. The necessary adjustments require great precision and delicacy to bring the assembly into optimal optical alignment. Once aligned, the alignment is often difficult to maintain as it is influenced by thermally driven stresses imposed on the optical assembly and the coherent light source. Mechanical mounting and vibration induced stress may also cause undesirable misalignment effects.

The most critical alignment in the prior correlators, as recognized by Lucas, is the adjustment of the position of the filter SLM 20 relative to the input SLM 16. This adjustment is critical in the geometry of the Lucas patent. The patented correlator maps a specific spatial frequency component of the input image onto a specific point in the focal plane of the first focusing mirror 18. For proper operation, each specific input image frequency component must be further modulated (multiplied) by the specific corresponding filter frequency component. This requires that specific frequency components of the input image be mapped onto specific pixels of the filter SLM 20. For best operation, an even more stringent condition must be met: the specific frequency component of the input image must be mapped onto the center of the corresponding filter pixel. This requires that the position of the filter SLM 20 be adjusted in x, y and z directions relative to the input SLM 16, with an accuracy typically on the order of only a few microns.

In the prior optical correlators the input and filter SLMs are difficult to precisely position. Once positioned, their relative position is difficult to maintain in the face of inevitable mechanical and thermal stresses and changes in environmental conditions.

SUMMARY OF THE INVENTION

The invention is a method and apparatus for adaptively aligning an optical correlator.

Rather than introducing the coherent beam into an optical assembly at a fixed angle as in prior correlators, the invention uses a beam deflector, which dynamically varies the beam deflection in response to a correction signal. A feedback system detects misalignment and provides a correction signal which causes the beam deflector to bring the optical correlator back into proper alignment.

In order to dynamically align an optical correlator (which includes an input SLM, a filter SLM, and a photodetector), the invention uses a test pattern to modulate the input SLM, as simultaneously an independently Fourier transformed, frequency domain reference pattern is applied to the filter SLM. If the optical path is correctly aligned, including the critical alignment of the input and filter SLMs, a two-dimensionally Fourier transformed image of the input SLM test pattern will be focused on the filter SLM, with frequency components aligned to the corresponding frequency components in the independently transformed frequency domain reference pattern. The resulting image at the photodetector will in that case be a sharp intensity spike at a predictable location. If, on the other hand, the optical alignment is slightly in error or drifts out of alignment, the transformed test pattern will not align properly with the corresponding frequency components of the frequency domain reference pattern at the filter SLM. In that case the resulting image at the photodetector will be slightly diffuse and/or of relatively lower intensity.

The signal from the photodetector output is used to derive a feedback signal indicative of the error in alignment. The feedback signal is then processed and an appropriate correction signal is applied to an electro-mechanical actuator array, which slightly alters the direction of the coherent beam. This slight change in beam angle slightly adjusts the alignment of the transformed test pattern image on the filter SLM, thereby dynamically bringing the optical correlator back into alignment.

Independent feedback loops are preferably provided for two-dimensional adjustment in preferably orthogonal directions of beam deflection. During operation of the optical correlator, the alignment is tested occasionally to maintain proper alignment. A feedback loop with occasional sampling functions as a hill climbing servo seeking the highest correlation peak with test patterns and maintaining a lock on the correlation peak despite variation in thermal or mechanical environment.

DETAILED DESCRIPTION

The invention dynamically aligns an optical correlator by introducing a coherent beam into the optical assembly at an angle which is dynamically adjusted by a feedback system. The feedback system detects a deviation of the correlator from a predetermined alignment characteristic—typically optimal alignment—and provides an appropriate correction signal to a beam deflector to bring the correlator back into optimal alignment.

Figure 2:
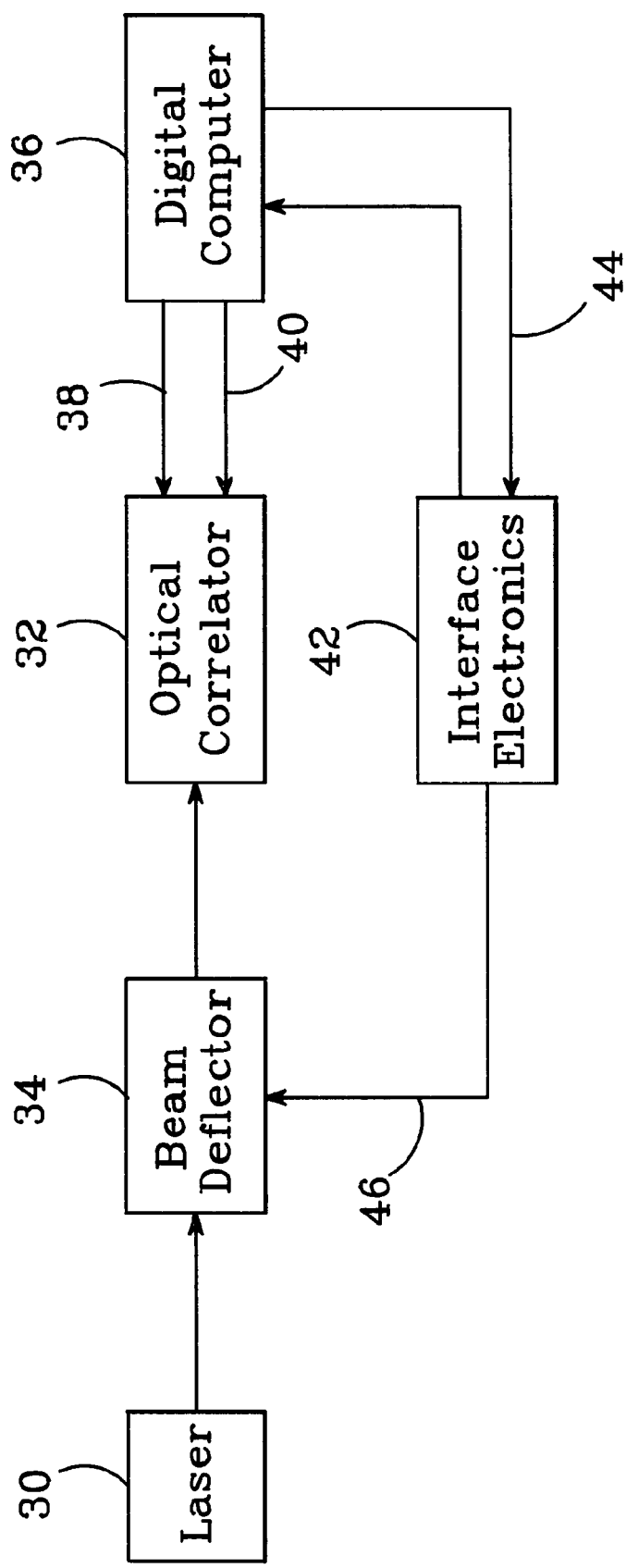
FIG. 2 is a block diagram of the invention.

FIG. 2 shows a system-level overview of the invention. A coherent beam of radiation, typically provided by a laser 30, is introduced into an optical correlator 32 by a beam deflector 34. A digital computer 36 or equivalent digital logic circuits provide a test pattern 38 and a frequency domain reference pattern 40 to the optical correlator 32. As in prior optical correlators, discussed above, the optical correlator 32 modulates the coherent beam with the test pattern, optically transforms the modulated beam into a frequency domain transform of the test pattern 38 and optically compares the frequency domain transform of the test pattern 38 with the frequency domain reference pattern 40, independently supplied by the digital computer 36. The comparison of the two patterns is performed in the frequency domain representation, and results in a beam modulated by the coincidence or correlation of the test pattern 38 with the frequency domain reference pattern 40. The image representing the correlation, which indicates the accuracy of the correlator's alignment, is then optically transformed back into a spatial domain representation and detected by a photodetector to yield an output.

The output of the optical correlator 32 is converted by interface electronics 42 to digital form and stored by the digital computer 36. The digital computer 36 processes this output information and implements a hill-climbing servo system which detects deviations from a pre-determined alignment characteristic and derives an appropriate digital correction signal (or signals) 44. The correction signal (or signals) 44 is converted to appropriate analog levels by the interface electronics 42 and a resulting feedback signal 46 drives the beam deflector 34 to adjust the angle of the coherent beam, bringing the optical correlator 32 back into alignment.

Figure 1:
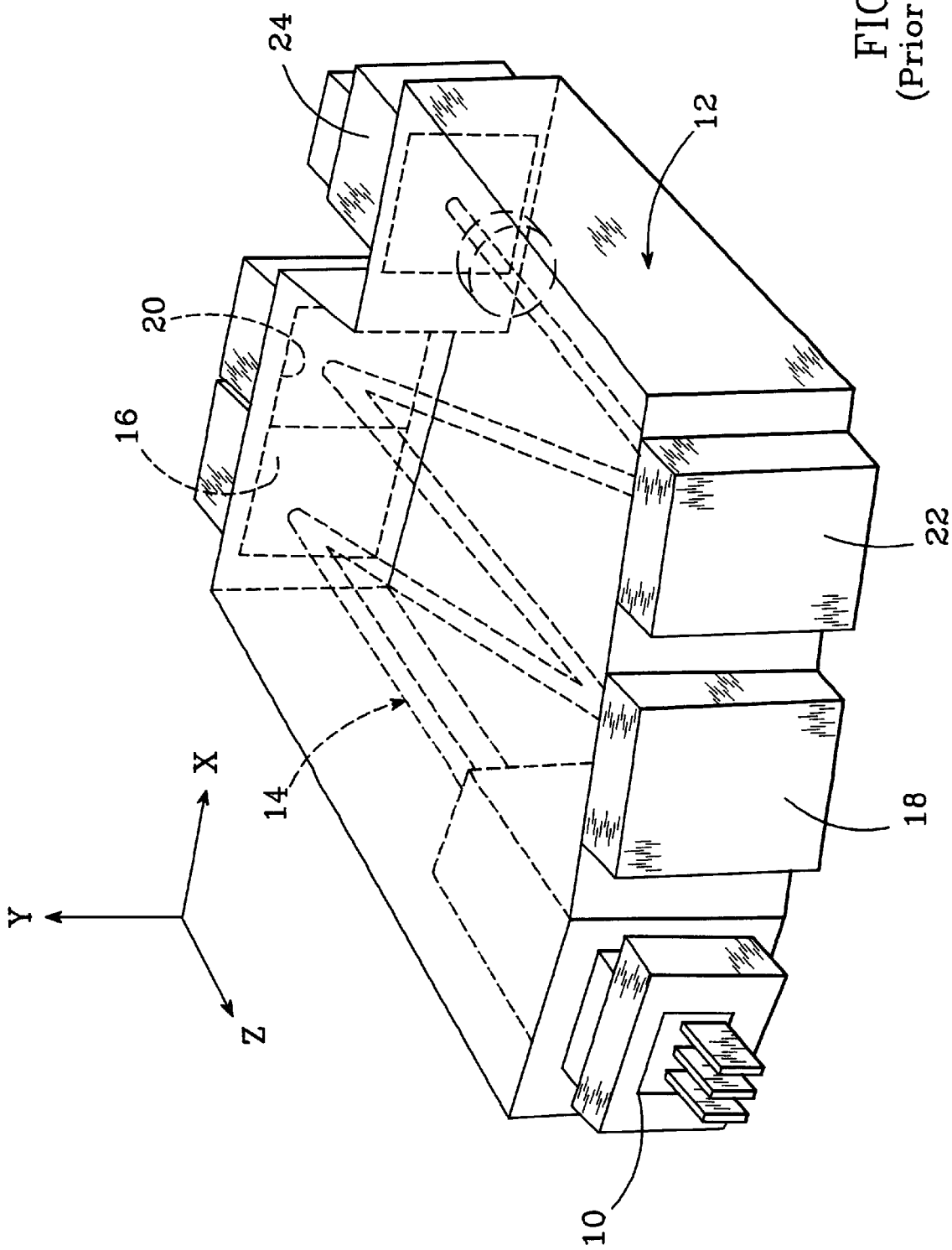
FIG. 1 is a perspective view of a prior art optical correlator.
Figure 3:
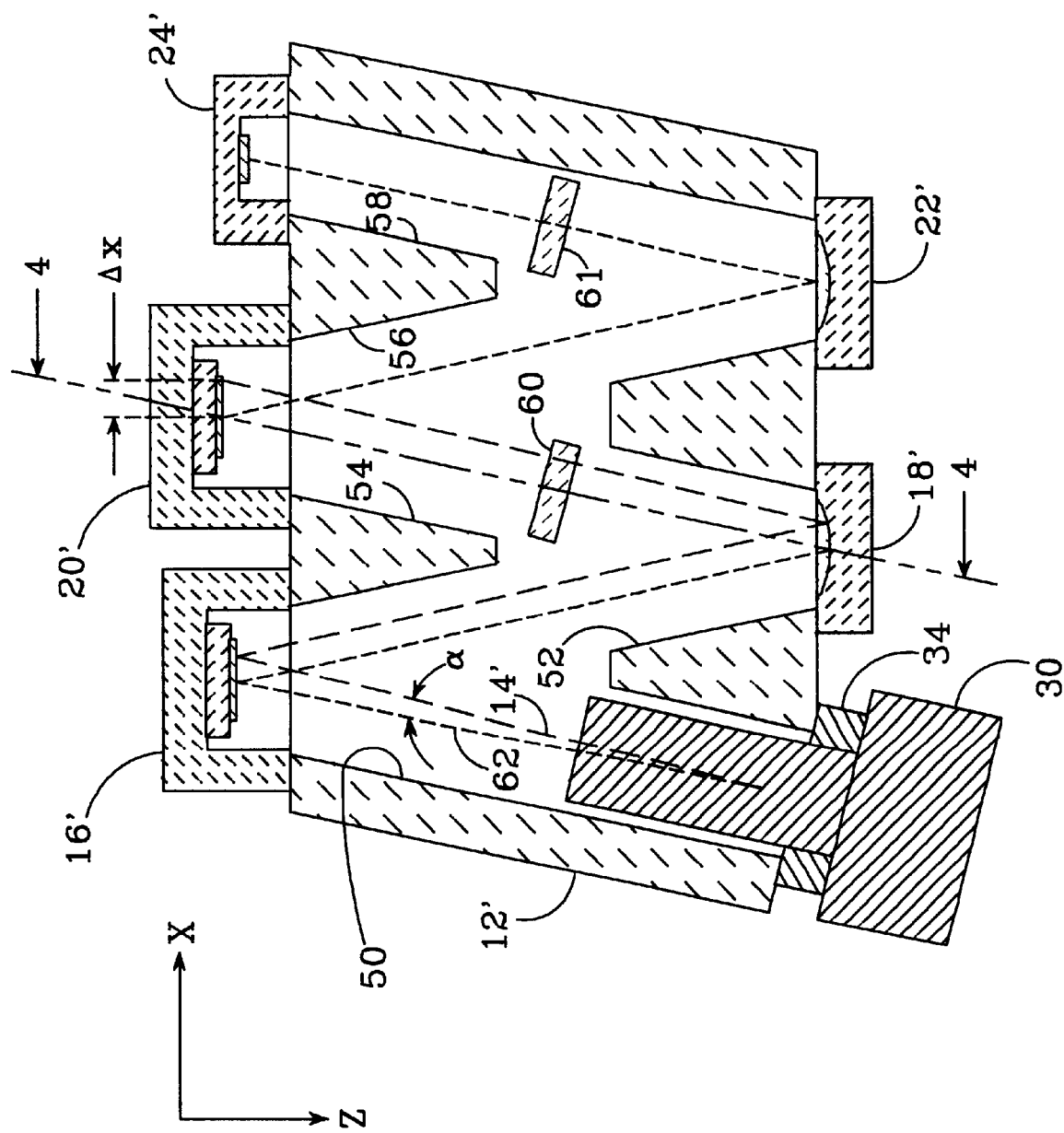
FIG. 3 is a plan sectional view of an optical correlator incorporating the invention.

FIG. 3 shows an optical correlator 32 incorporating a beam deflector 34 for correcting system misalignments. Elements which are analogous to elements shown in prior art FIG. 1 are labeled with primed (') numbers corresponding to the numbers of the analogous prior art elements. In the embodiment shown, the beam deflector 34 is an electromechanical actuator array mounted upon an optical support body 12'. The actuator array in turn supports a laser assembly 30, which includes collimation optics and an apodizing filter. The collimation optics and apodizing filter (both not shown) are used conventionally to obtain a well collimated beam 14' with approximately constant intensity over some radial beam profile (which is preferably larger than the optically active surface of the input SLM 16'). The optical support body 12' supports the active and passive optical elements which define a folded, zig-zag optical path for the beam 14'. In the embodiment shown, the optical support body 12' includes tunnels 50,52,54,56 and 58 for the optical path of the beam 14'. Although a solid transparent optical support body 12' may alternatively be used, tunnels reduce the distortions caused by inhomogeneities in the solid material of the body.

The beam 14' originating from laser assembly 30 is reflected at an angle by the input SLM 16' at the end of tunnel 50; the beam 14' then propagates back to a first focusing mirror 18' at the end of tunnel 52. The beam 14 is again reflected at an angle from the focusing mirror 18' and propagates through a first polarizer 60 in tunnel 54 to a filter SLM 20' at the end of tunnel 54, where it forms a transformed image of the information modulated onto the beam 14 by the input SLM 16'. The beam 14' is further modulated and reflected from the filter SLM 20'. Next the twice modulated beam propagates to a second focusing mirror 22' at the end of tunnel 56, and is reflected a fourth time before propagating through a second polarizer 61 in tunnel 58 to arrive at a photodetector 24', at the end of tunnel 58, which detects the output (correlated) signal. The zig-zag optical path followed by the beam 14 which results from the above described optical placements is a convenient geometry, but is only one of many possible geometries which can be used with the invention. Various folded, polygonal or in-line geometries, for examples, could also be used.

Figure 4:
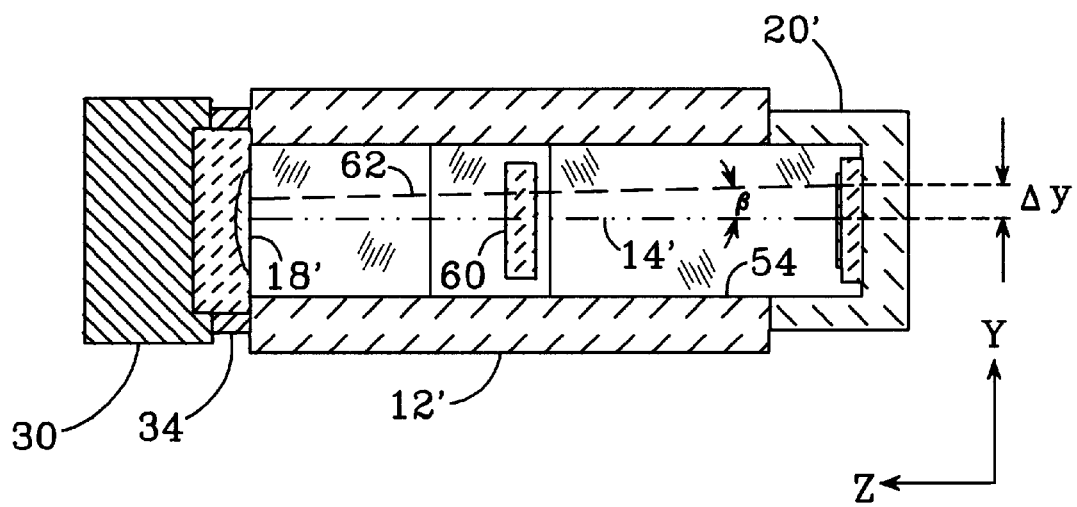
FIG. 4 is a sectional view taken along section line 4—4 of FIG. 3.

The beam deflector 34 is typically an electro-mechanical actuator array interposed between the laser assembly 30 and the optical support body 12'. When a feedback signal is applied to the beam deflector 34, it tilts the laser and thereby causes the angle of the optical path of beam 14' to shift slightly. This is illustrated by shifted optical path 62, the angle of which is shifted by angle α relative to the original optical path of beam 14' as shown. A slight change in the entry angle is magnified as the beam propagates through the shifted optical path 62, causing the image formed at the filter SLM 20' to shift by Δx. As shown in FIG. 4, the beam can also be deflected by the beam deflector 34 in the y direction, resulting in a shift in image position of Δy relative to the filter SLM 20'. A shift in the image position at the filter SLM 20' in turn affects the alignment of the transformed image with the filter SLM 20' and gives rise to a corresponding change in the output image at the photodetector 24'.

To allow for slight shifts in the beam incident angle, the collimated beam diameter should preferably be sufficiently larger than the input SLM 16' so that the input SLM 16' remains completely illuminated despite any beam shifts, most preferably with an approximately constant intensity of illumination.

Figure 5A:
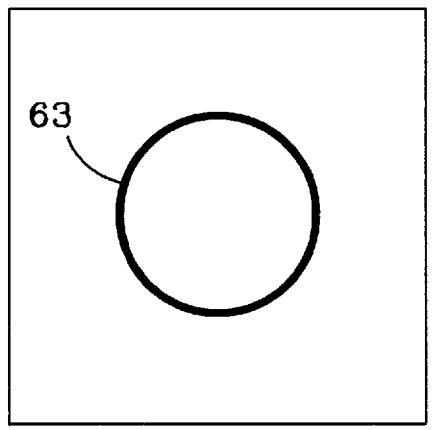
FIGS. 5*a*, 5*b*, and 5*c* are enlarged images of an example of a spatial test pattern, a frequency domain representation of the spatial test pattern, and the output (autocorrelation) pattern obtained at the photodetector, respectively.

To detect deviations of the above described optical correlator from optimal alignment, a test pattern and a corresponding frequency domain reference pattern (or "filter") must be simultaneously used to modulate the input SLM 16' and the filter SLM 20', respectively. As described in the prior art, these SLMs are typically pixilated addressable arrays of active electro-optical modulating elements, usually arranged in a two-dimensional matrix. The individual pixels of the input SLM 16' are modulated electronically so that by their reflections they collectively modulate the beam with a pattern such as a ring-shaped pattern 63 shown in FIG. 5a (as one example). The ring-shaped pattern 63 denotes the portion of the input SLM 16' which is be modulated to reflect incident light. The focusing mirror 18' has a focal length which images the beam from the input SLM 16' onto the filter SLM 20', producing the two-dimensional Fourier transform of the input image (as modulated by the input SLM 16') at the filter SLM 20'.

Figure 5B:
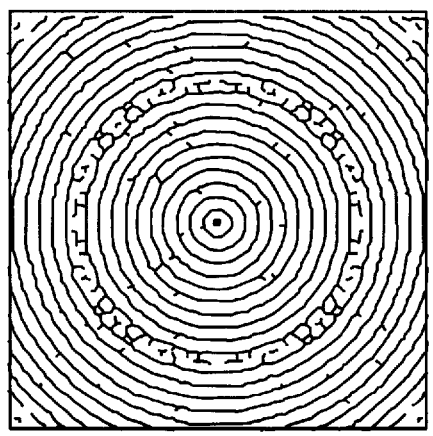

While the test pattern modulates the beam at the input SLM 16', a frequency domain reference pattern is used to modulate the filter SLM 20'. The light reflecting from the filter SLM 20' thus represents a comparison of the transformed input image with the frequency domain reference pattern. The frequency domain reference pattern should preferably be the independently obtained Fourier transform, taken in two dimensions, of the input test pattern, resulting in a frequency domain representation of the spatial test pattern. The Fourier transform of the test pattern should preferably be independently obtained prior to applying the test pattern to the input SLM 16', by digital calculation, optical transformation or other conventional transformation methods. FIG. 5b shows an approximate reproduction of the pattern obtained by Fourier transforming FIG. 5a in two dimensions; FIG. 5b would thus be an appropriate frequency domain reference pattern for use (at the filter SLM 20') along with FIG. 5a (at the input SLM 16').

Figure 5C:
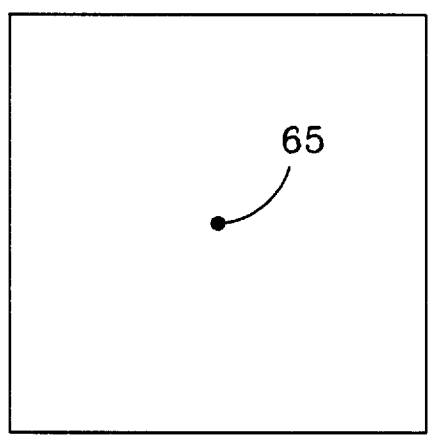

When a spatial test pattern and the corresponding frequency domain reference pattern are present and properly aligned at SLMs 16' and 20', respectively, the output at the photodetector 24' will be a bright peak indicated by a spot of light centered at some location on its pixilated matrix. The indication of high autocorrelation will be a high intensity, very focused and localized output peak signal. This situation is illustrated by FIG. 5c, in which the spot 65 indicates the peak signal at the exact center of the matrix of the photodetector 24'. Any departure from perfect optical alignment of SLMs, caused for instance by a deflection of the beam, will cause the output to lose focus and intensity and to become more diffuse, indicating a decrease in correlation. The position of the peak will also move slightly on the matrix of the output photodetector 24'. Thus, by applying a spatial test pattern and a corresponding frequency domain representation (or "filter") test pattern, a comparison signal is produced by the photodetector 24' which indicates the accuracy of the optical alignment. The comparison signal is then used to derive an appropriate feedback or correction signal which, when applied to actuate the beam deflector 34, brings the optical correlator back into optimum alignment. The feedback system used to maintain optimal alignment is preferably implemented as a "hill climbing" servo system. In such a system, at least one low level oscillating "dither" signal 66, shown vs. time in FIG. 6, is applied to the beam deflector 34 to produce an oscillating deflection of the coherent beam 14'. Preferably two separate, orthogonal dither signals would be applied sequentially, to produce independent deflections of the beam in x and y directions. The feedback adjustments would then be performed independently in each of the independent directions. For simplicity, one dimension of adjustment is illustrated in FIG. 2, but the invention is not so limited.

Figure 7:
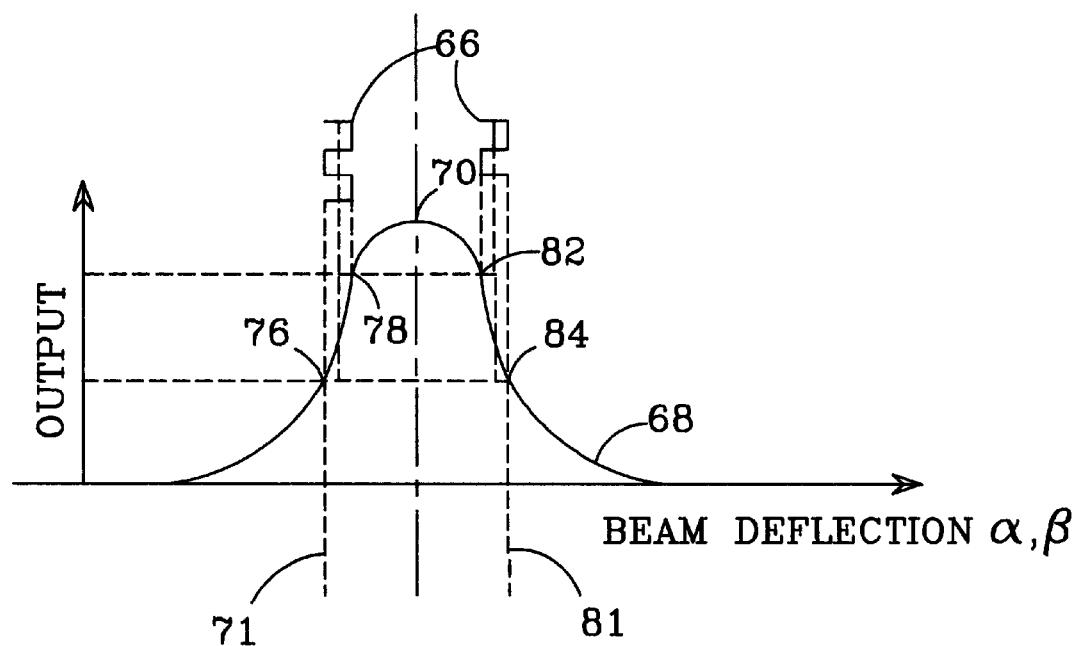
FIG. 7 is a graph of peak photodetector output vs. beam deflection, identifying various operating points.

Referring to FIG. 7, the output curve 68 shows the output of the photodetector 24' (on the vertical axis) as a function of the deflection of the coherent beam 14' (for example as a function of the deflection angle α in FIG. 3) with a test pattern modulating the input SLM 16' and a corresponding frequency domain reference modulating the filter SLM 20'. A maximum exists at point 70, the angle of optimum alignment.

A hill-climbing servo method is preferably used to seek the optimum point of alignment (point 70). Its operation can be understood generally by first considering two special cases.

For the first special case, suppose that initially the deflection angle deviates from the optimum slightly so that the output is that at the point on line 71, slightly to the left of center in FIG. 7. A small perturbation or "dither signal" 66, which oscillates between phases 72 and 74 in FIG. 6, is applied to the beam deflector 34, causing the intensity of the correlation peak on photodetector 24' to respond by oscillating between the 2 levels marked 76 and 78 (shown on both FIGS. 6b and 7). It should be understood that the position of the correlation peak may move slightly during the deflection; the intensity of the correlation peak is selected by finding the maximum intensity on the matrix of the photodetector 24' (for example, by processing the photodetector output with digital computer 36, as discussed below). The first sampled intensity level 76 represents the intensity of the correlation peak sampled during dither phase 72, the other the corresponding peak sampled during dither phase 74.

Perturbing or dithering the deflection in this manner will produce a time variation in the intensity of a correlation peak 80 measured at the photodetector 24'. The intensity is plotted vs. time in FIG. 6b (with time on the horizontal axis). The correlation peak intensity 80 oscillates in phase with the dither signal 66. Subtracting the intensity 80 sampled during the negative dither phase from the intensity 80 sampled during the positive dither phase yields a positive correction signal, indicating that the alignment angle ($\alpha$ or $\beta$) is too low (for example, $\alpha$ is left of center).

Figure 6A:
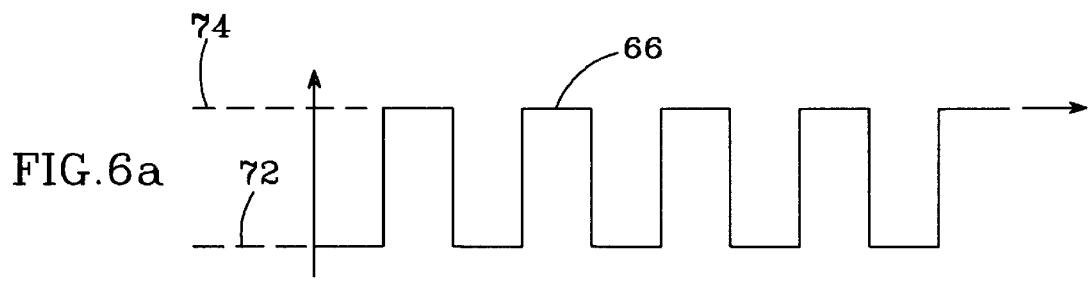
FIGS. 6*a*, 6*b*, 6*c* and 6*d* are timing diagrams respectively showing in (a) a dither signal applied to the beam deflector, (b) the peak photodetector output at an operating point below optimal deflection, (c) the peak photodetector output at an operating point above optimal deflection, and (d) the peak photodetector output at optimal deflection.
Figure 6B:
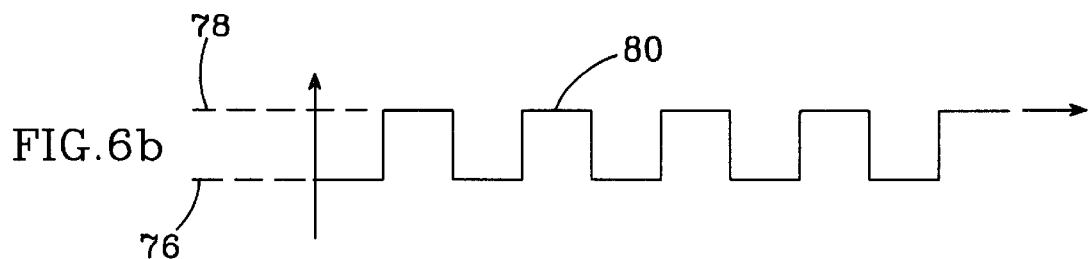
Figure 6C:
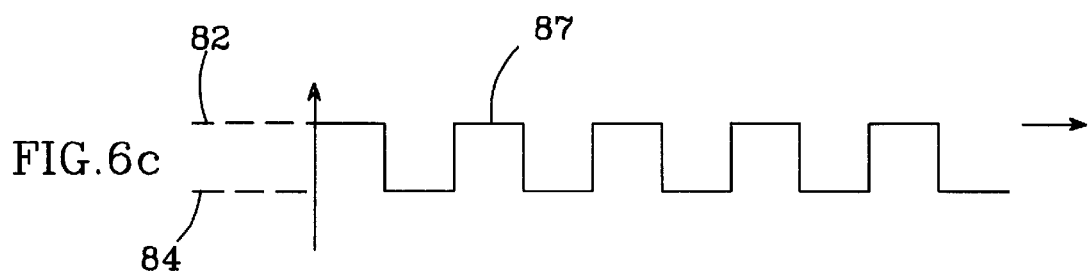
Figure 6D:
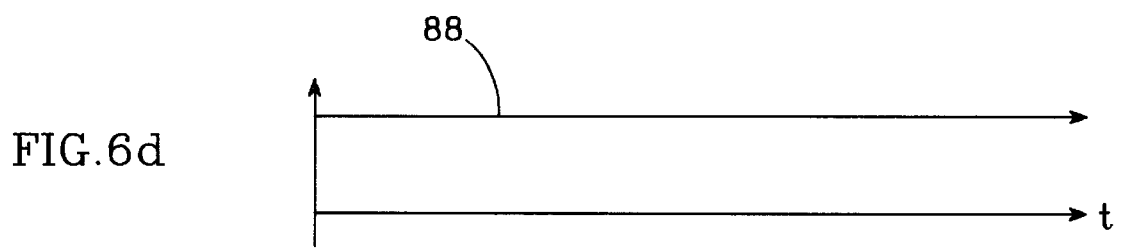

For the second special case, changing our initial assumption, suppose that the beam angle deviates slightly to the other side of optimum, so that the correlation peak intensity is centered on the line 81 in FIG. 7. Application of the dither signal 66 will then cause the intensity of the correlation peak to oscillate between levels 82 and 84 on the negatively sloped side of curve 68. The resulting dithered intensity 87 of the correlation peak is shown in FIG. 6c. The intensity 87 oscillates between levels 82 and 84 as shown, with phase inverted with respect to the dither reference 66, which can be seen by superimposing FIG. 6c and FIG. 6a. In this case subtracting the intensity 87 sampled during the negative dither phase from the intensity 87 sampled during the positive dither phase yields a negative correction signal, which indicates that the deflection angle ($\alpha$ or $\beta$) is too high.

It is only when the alignment of the correlator system is such that the intensity of the correlation peak is precisely at the peak 70 of the output curve (optimum) that the correlation peak intensity will be the same at both excursions of the dither signal 66, since it will differ from optimum by the same amount on both sides of the peak 70 (assuming a symmetric curve 68). This situation results in a flat peak intensity signal 88 (FIG. 6d) which indicates optimum alignment.

The perturbation or dither signal thus furnishes a way to detect the slope or derivative of the output signal with respect to coherent beam angle (for example, $\alpha$ or $\beta$). By seeking the zero of the derivative a maximum of the output signal can be found. Any deviation of the optical assembly alignment from optimum will cause an unequal photodetector output on the positive and negative excursions of the dither signal. Subtracting the peak detector output sampled on the negative excursion from the peak detector output sampled on the positive excursion yields an appropriate correction signal for feedback to the beam deflector 34, to bring the optical correlator 32 back into alignment.

In the preferred embodiment, the invention employs independent beam deflection and feedback systems on multiple axes, preferably perpendicular to one another, allowing correction of the correlator for example in both the x and y directions indicated in FIGS. 3 and 4. The independent alignments should preferably be performed individually and sequentially, for example first x dither then y dither, under control of the digital computer 36.

Figure 8:
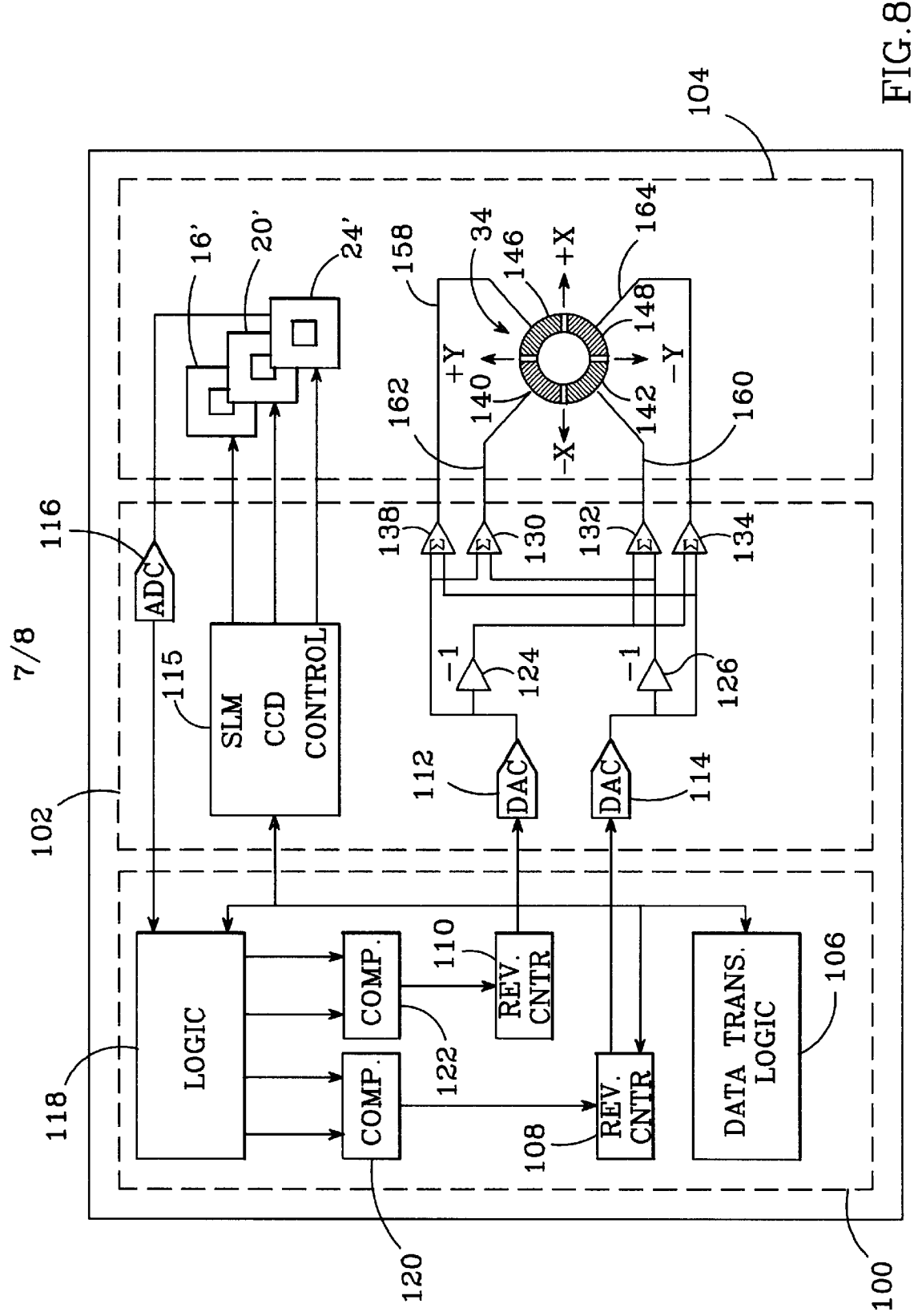
FIG. 8 is a block diagram of an adaptive alignment system which can be used in the invention, including a beam deflector shown in plan view.

FIG. 8 shows in greater detail one embodiment of a complete correlator system of the invention, including computer functional blocks 100, interface electronics 102 and a correlator optical assembly 104. The computer functional blocks 100 can be executed in software by the digital computer 36 or equivalent logic circuits.

Data transfer sequencing logic 106 controls the overall timing, setting aside occasional frames for the adaptive alignment, while maintaining overall throughput of the optical correlator for normal operation. Data transfer sequencing logic 106 also generates at least one digital dither signal. Preferably two separate digital dither signals are applied to two reversible counters: counter 108 for the x direction dither and counter 110 for the y direction dither. The outputs of counters 108 and 110 are converted to an analog voltage by digital-to-analog converters (DACs) 112 and 114 and supplied to interface electronics 102, including inverter and summing amplifier circuits (described below) which in turn drive the beam deflector 34.

At the same time that the dither signal is applied to the beam deflector 34, the input test pattern and the frequency domain reference pattern are applied to the input SLM 16' and the filter SLM 20', respectively, by an SLM and CCD control logic block 115 (preferably executed by digital computer 36). The resulting output from the photodetector 24' is converted by an analog-to-digital converter (ADC) 116 for easier manipulation by the digital computer 36 (or equivalent digital logic). The entire matrix of output levels is converted and input to the digital computer 36.

The maximum amplitude detection logic 118 (which is preferably implemented by the digital computer 36) compares the digitized photodetector output values associated with each individual pixel on the matrix of the photodetector 24' and finds the highest value on the photodetector matrix. This value is associated with the peak correlation point. The position of the output peak, and hence the pixel address of the peak, may vary slightly during the adjustment. The two peak values, one corresponding to each phase of the dither, are detected and stored. Dual values (for each dimension) are then compared by comparator functional blocks 120 (for the x correction) and 122 (for the y correction). If the optical apparatus alignment deviates from the optimum, the dual stored values for that dimension will be unequal and the appropriate comparator functional block 120 or 122 will generate a correction signal, which may be either positive or negative.

The correction signal which is output by the comparator functional blocks 120 and 122 will determine the direction of count for reversible counters 108 (x channel) and 110 (y channel). The reversible counters count pulses generated by the data transfer sequencing logic 106 for this purpose. The outputs of the reversible counters 108 and 110, which hold the current position information for the actuator array 32, are converted by DACs 112 and 114 (one for each channel), producing dual analog correction voltages: one for the x direction, one for the y direction.

Figure 9:
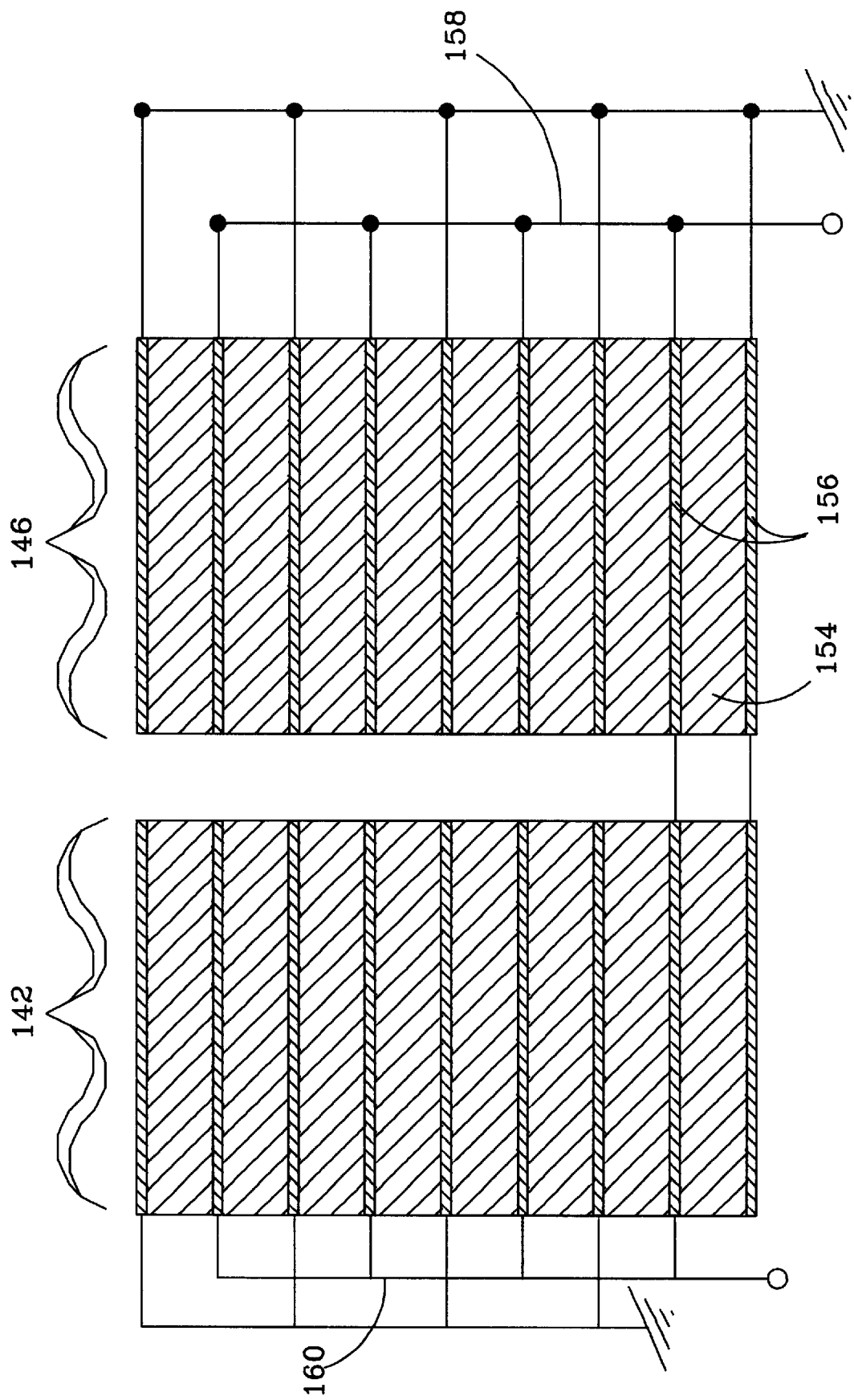
FIG. 9 is a sectional view of a piezoelectric actuator array suitable for use as a beam deflector.

The manner of applying the correction voltages will depend upon the specific geometry and characteristics of the beam deflector 34, and a wide variety of arrangements are possible. FIGS. 8 and 9 show only one such possibility. In the embodiment shown, the beam deflector 34 employs electromechanical actuators 140, 142, 146 and 148 which are positioned on diagonals relative to the x,y coordinate system and together form an actuator array. Inverting amplifiers 124 and 126 produce complementary signals by inverting the analog correction voltages. The analog correcting voltages and the complementary signals are then summed in a cross-connected network of summing amplifiers 130, 132, 134 and 138 to produce feedback drive voltages 158, 160, 162 and 164. These feedback drive voltages in turn produce the the proper x and y correction movements of the electromechanical actuators.

In the embodiment shown in FIG. 8, the feedback drive voltages are converted to movement in the actuator array by extending and shrinking oppositely positioned piezoelectric segments. For example, to move the deflector in the minus x direction, segments 140 and 142 would be contracted, while segments 146 and 148 would be expanded.

FIG. 9 shows more detail of an actuator array which can be used in the beam deflector 34 of the invention. The entire array (beam deflector 34) is made up of four actuators, arranged in quadrants, each shaped like an arciform quarter-section and all four together forming a broken ring. Each arciform quarter section preferably includes multiple piezoelectric layers 154, stacked in a laminar fashion, together making up one actuator. Each piezoelectric layer 154 is preferably made from a piezoelectric ceramic material. In the side cross section shown in FIG. 9, only two actuator segments 142 and 146 can be seen. Electrode layers 156, preferably metallized, are interposed between each pair of piezoelectric layers 154. Alternate electrode layers 156 of actuator 146 are connected to the feedback drive voltage 158; similarly, alternate electrode layers of actuator 142 are connected to the feedback drive voltage 160. Actuators 148 and 140, not shown in FIG. 9, are connected analogously. Stacking the piezoelectric material in multiple layers permits greater extension and contraction in response to an applied voltage.

The use of piezoelectric ceramics in actuators is well known and described in numerous sources. See, for example, *Piezoelectric Ceramics*, J. van Randeraat (Publications Dept., Ferroxcube Corporation, Saugerties, N.Y. 1974). Piezoelectric ceramic materials or actuators are widely available commercially, for example from Aura Ceramics (Minneapolis, Minn.), Polytec PI, Piezosystem Jena (Germany), or Philips Electronic Components (available in U.S. through Signetics Corp., Sunnyvale, Calif.).

In the embodiment shown in FIG. 3, the actuator array of FIG. 9 operates as a beam deflector by moving laser assembly 30 relative to the optical support body 12'. In this embodiment the laser assembly 30 is rigidly mounted upon the beam deflector 32, which in turn is moveably mounted upon optical support body 12'. Upon application of voltage to the actuators of the beam deflector 34, the actuators expand or contract as required, thereby moving the laser 30 and deflecting the beam 14'.

It will be readily seen that other arrangements are possible which will allow beam deflection, either by electromechanical actuators or by other devices. Beam deflection can be accomplished readily by moving a mirror, a lens, a fiber optic coupling or a prism, as examples, rather than by moving the light source as described above. Deflection could readily be accomplished by moving focusing mirror 18', for example. These and other methods of deflecting the beam are also within the scope of the invention. It is necessary only that the beam deflector provide sufficiently fine control, preferably to permit alignment of the transform image with the filter SLM 20' within less than a filter SLM pixel diameter.

In some applications the above described apparatus and method can be used to dynamically align an operating optical correlator in the following way: during normal optical correlator operation, the alignment must be tested occasionally. The alignment can be performed with only minor interruption of the correlator's normal operations. In the course of performing sequential, multi-frame optical correlations (correlating input data with reference data in the frequency domain to produce output information based on the correlation), correlator operation can be occasionally interrupted, preferably under control of the digital computer 36, for a few frames of adaptive alignment. The intervals between such adaptive alignment frames should be determined by the thermal and mechanical environment of the device. The alignment can typically be quickly performed, requiring only a low duty cycle and resulting in the loss of only a few frames of correlator activity. After the alignment procedure is performed, the correlator is switched back to normal optical processing tasks until the next alignment interval.

While particular embodiments of the invention have been shown and described, numerous variations and alternate embodiments will occur to those skilled in the art. Accordingly, it is intended that the invention be limited only in terms of the appended claims.

We claim:

1. A method of dynamically aligning an optical device arranged to receive a beam of electromagnetic radiation, comprising the steps of:

introducing the beam of electromagnetic radiation into the optical device;

modulating the introduced beam with a spatial test pattern to produce a modulated beam;

causing an oscillating deflection of the beam;

transforming the modulated beam to obtain a frequency domain representation of the spatial test pattern;

comparing the frequency domain representation with a frequency domain reference pattern, to obtain a comparison signal indicative of a degree of deviation from an alignment characteristic;

sampling at least two levels of the comparison signal which correspond to at least two respective phases of the oscillating deflection;

analyzing said at least two levels to determine a direction of a deviation from the alignment characteristic; and adjusting a path of the beam in response to the comparison signal and the direction of deviation, to compensate for deviation from the alignment characteristic.

2. The method of claim 1, wherein the comparing step comprises the steps of:

further modulating the frequency domain representation of the spatial test pattern with the frequency domain reference pattern to obtain a further modulated beam, transforming the further modulated beam to a spatial domain comparison pattern, and detecting the spatial domain comparison pattern to obtain the comparison signal.

3. The method of claim 2 wherein the step of adjusting the path of the beam comprises the steps of:
  activating an electromechanical actuator in response to the comparison signal, to produce movement of the electromechanical actuator, and
  adjusting the path of the beam within the optical device in response to the movement of the electromechanical actuator, to compensate for the deviation from the alignment characteristic.

4. The method of claim 3 wherein the electromechanical actuator comprises a piezoelectric actuator.

5. A dynamically adaptive optical alignment system, comprising:
  an optical image correlator arranged to receive a beam of electromagnetic radiation, to correlate images and to produce an output representing the correlation,
  a feedback system, coupled to the output of the optical image correlator and arranged to detect from the output a deviation of the optical image correlator from a predetermined alignment characteristic, and to produce a feedback signal in response to the deviation, and
  a beam deflector which is responsive to the feedback signal, for variably adjusting the path of the beam through the optical image correlator, to compensate for deviation from the alignment characteristic.

6. The dynamically adaptive optical alignment system of claim 5, wherein the optical image correlator comprises:
  an input spatial light modulator (SLM) arranged to receive the beam and modulate it with a spatial test pattern,
  a transforming optical element that transforms the modulated beam to a frequency domain representation,
  a filter SLM arranged to receive the frequency domain representation of the spatial test pattern, and to further modulate the frequency domain representation with a frequency domain reference pattern, and
  a photodetector which produces an output based on the correlation between the frequency domain representation of the spatial test pattern and the frequency domain reference pattern.

7. The dynamically adaptive optical alignment system of claim 6, wherein the frequency domain reference pattern is obtained essentially by Fourier transformation of the spatial test pattern.

8. The dynamically adaptive optical alignment system of claim 7, wherein the Fourier transformation is performed by an apparatus which is independent from the optical correlator.

9. The dynamically adaptive optical alignment system of claim 5, wherein the beam deflector comprises a support for a beam source and an electromechanical actuator which responds to the feedback signal by adjusting the position of the beam source support to deflect the beam.

10. The dynamically adaptive optical alignment system of claim 9, wherein the electromechanical actuator comprises a piezoelectric actuator.

11. The dynamically adaptive optical alignment system of claim 5, wherein the beam deflector comprises:
  a moveable mirror for deflecting the beam, and
  an electromechanical actuator arranged to move the mirror in response to the feedback signal.

12. The dynamically adaptive optical alignment system of claim 5, wherein the feedback system comprises:
  a computer, programmed to analyze the output of the photodetector to recognize deviations of the optical correlator from an alignment characteristic and to produce in response a correction signal output, the correction signal output coupled to the beam deflector;
  and wherein the beam deflector is arranged to respond to a dither signal, which causes an oscillating perturbation of the beam deflection.

13. The dynamically adaptive optical alignment system of claim 12, wherein the computer is programmed to produce a dither signal;
  wherein the dither signal is coupled to the beam deflector, causing the deflection of the beam to oscillate;
  wherein the computer is programmed to compare the output of the photodetector with the dither signal to determine the slope of the photodetector output with respect to the dither signal;
  and wherein the correction signal output is calculated to adjust the alignment of the optical correlator to a point of substantially zero slope of the photodetector output with respect to the dither signal.

14. A method of dynamically aligning an optical correllator, arranged to receive a beam of electromagnetic radiation and to correlate unknown images with known image masks, comprising the steps of:
  introducing the beam of electromagnetic radiation into the optical correlator;
  modulating the beam with a first spatial light modulator to impose a test pattern of intensity distribution across the beam;
  optically transforming the modulated beam to obtain a frequency domain image representation of the test pattern;
  comparing the frequency domain image representation with a pre-computed frequency domain reference pattern, to obtain a comparison signal indicative of deviation of the optical correlator from optical alignment;
  deflecting the beam in response to the comparison signal to compensate for said deviation from optical alignment.

* * * * *